United States Patent [19]

Hill, III

[11] Patent Number: 4,727,383

[45] Date of Patent: Feb. 23, 1988

[54] BURNISH PROTECTED ELECTROSENSITIVE RECORDING

[75] Inventor: John A. Hill, III, Milton, Mass.

[73] Assignee: Dennison Manufacturing Company, Framingham, Mass.

[21] Appl. No.: 937,854

[22] Filed: Dec. 4, 1986

[51] Int. Cl.⁴ .................. G01D 15/34; G01D 15/08; B05D 5/12

[52] U.S. Cl. .................. 346/135.1; 346/1.1; 346/162; 427/121

[58] Field of Search ............... 346/135.1, 76 PH, 165, 346/162, 1.1; 427/121, 122, 123, 58

[56] References Cited

U.S. PATENT DOCUMENTS 4,339,758  7/1982  Bhatia et al. ............... 346/1.1
4,438,170  3/1984  McCue ..................... 346/135.1
4,554,562  11/1985  Afzali-Ardakani et al. ..... 457/58 X Primary Examiner—E. A. Goldberg
Assistant Examiner—Patrick W. Foster
Attorney, Agent, or Firm—George E. Kersey

[57] ABSTRACT

Electrosensitive recording using a composite structure formed by a base support for a resinous contrast layer containing amorphous silicon dioxide, polycrystalline silicon dioxide, and a polyolefin, which provide an anti-abrasion characteristic. The contrast layer has an overlying metallic surface that is desirably provided by vapor deposition. The electrostatic structure provides suitable print quality for information recorded by electrically actuated styli and has the property of suitable resistance to unwanted stripping or burnishing of the metallic surface.

19 Claims, 3 Drawing Figures

BURNISH PROTECTED ELECTROSENSITIVE RECORDING

BACKGROUND OF THE INVENTION

The present invention relates to electrosensitive recording, and more particularly, an electrosensitive recording material that is resistant to abrasion or burnishing.

Electrosensitive recording materials generally consist of paper coated on one side by a resinous material with a metallic layer subsequently vapor deposited on top of the resin. A printhead or stylus is passed over the metallic layer which is burned off upon electrical actuation of the printhead thereby exposing the resinous material underneath. The resin often includes a pigment, ink or dye to provide a suitable contrast with the surrounding metallic surface. This is illustrated in U.S. Pat. Nos. 3,995,083 and 4,339,758.

The problems of print quality and stylus wear have resulted in the use of a variety of materials in the middle contrast layer. In U.S. Pat. Nos. 3,786,518; 3,831,179; 3,995,083; and 4,217,596 the contrast layer has included a lacquer coating or printing ink to enhance contrast. Amorphous silicon oxide has also been added to the contrast layer in U.S. Pat. No. 3,786,518 to enhance contrast of the exposed layer to the metallic coating and reduce wear on the stylus. However, the inclusion of amorphous silicon results in the buildup of debris on the stylus which periodically disrupts printing.

U.S. Pat. No. 4,339,758 demonstrated the use of crystalline silicon dioxide along with amrophous silicon dioxide. This resulted in a substantial reduction in the deposits of debris on the stylus apparently due to the scraping away of debris by the hard crystalline particles of silicon.

Many printers used in electrosensitive recording use a metallic or ground roller in contact with the electrosensitive recording surface to act as a ground in the form of a ground roller which runs across the metallic layer in order to complete the circuit with the printhead or stylus. Debris also tended to accumulate on the ground roller causing an interruption of the circuit and necessitating frequent cleaning. In Ser. No. 603,060 the problems raised by ground roll buildup were suitably addressed by the introduction of lubricants such as stearates into the contrast layer. The use of lubricants served to further reduce wear and the buildup of debris around both the stylus and the ground roller.

The disadvantages of using amorphous silicon oxides, namely excessive debris deposits and wear of the stylus were addressed in U.S. Pat. No. 4,217,596 which suggested the replacement of the silicon with a combustible organic mattecausing substance, preferably polystyrene or polyethylene in granular form. The polystyrene or polyethylene granules alone have been found to provide diminished contrast to the metallic layer. In U.S. Pat. No. 4,339,758 it was disclosed that polyethylene may be used as a film forming resin in conjunction with both crystalline and amorphous silica. However, since polyethylene does not dissolve well in organic solvents it does not bind adequately when used as a film forming resin in coatings employing organic solvents.

Many printers used in electrosensitive recording utilize a printhead that remains in constant contact with the metallic surface even during intervals between the printing of characters. This contact causes an undesirable stripping or burnishing of the metallic surface. This is especially true in "high contrast" printers where more styli are used in the printhead to enhance print quality. Printers such as the IBM model 3232, Axiom model EX801, models 1110-S and 1110-P from SCI Incorporated of Huntsville, Alabama, and the Sharp model DC2106 sold by Hycom, Inc., of Irvine, Calif., all use a dot matrix type of printhead. These printers require a smoother base stock that exhibits good anti-burnishing characteristics. The abrasion of the metallic surface while the printhead is in transit between successively printed characters not only contributes to additional debris and wear of the printhead, it produces a highly undesirable reduction in print quality. The inclusion of crystalline silicon as illustrated in U.S. Pat. No. 4,339,758 and Ser. No. 603,060 although producing superior results in many printing applications contributes to this burnishing. The silicon dioxide particles in the contrast layer produce hard jagged edges which protrude from the surface of the contrast material. These edges are subject to shearing as the printhead moves across the surface between printed characters.

Accordingly, it is the principal object of the invention to substantially reduce or eliminate burnishing of the electrosensitive paper when the printhead is in motion between the characters which it is generating.

A further object of the invention is to reduce the rate of wear of the printhead and the amount of debris generated by the unwanted abrasion of the surface.

SUMMARY OF THE INVENTION

In accomplishing the foregoing and related objects, an electrosensitive assemblage in which an intermediate contrast layer composed of a resinous dispersion of a film forming resin, a mixture of amorphous silicon and crystalline silicon dioxide supplemented by a polyolefin layer.

Without burnish protection, the combination of pressure and sliding forces of the print head cause a fracturing of the fragile electrosensitive surface, thus exposing the black contrast coating. With the addition of the crystalline silica, reduction in burnishing is achieved resulting from less head contact with the fragile surface. However, crystalline silica alone is not totally desirable as burnishing is still evident and head wear is greatly increased resulting from the high hardness level of the silicon particles. To overcome the disadvantages of crystalline silica, yet still take advantage of its head cleaning ability, addition of some form of coating was found desirable. In this case a dispersion of polyethylene was utilized. Addition of polyethylene or any dispersed polyolefin or polymeric wax provides a low friction coating around the crystalline silica and other contents of the contrast layer to minimize the fracturing force of the printhead against the surface. The synergism established by the addition of polyethylene to the crystalline silica filler achieves an unexpected but very desirable electrosensitive surface exhibiting low burnishing, reduced head wear and improved print contrast.

The polyethylene preferably constitutes between 3% and 12% by weight of the contrast material, most preferably 6%. A low density polyethylene with a specific gravity between 0.90 and 0.94 should be used. While the contrast coating is drying it was found that such a low density polyethylene will tend to migrate to the surface of the contrast layer in which the resin has a specific gravity of approximately 1.0. The polyethylene thereby forms a concentrated layer between the remainder of the contrast layer and the metallic layer. The crystalline silica tends to protrude above the contrast layer in the polyethylene free mixture forming jagged edges subject to fracture by the printhead. The addition of the polyethylene layer changes the topography of the surface that is subject to abrasion. The surface is much smoother with the jagged edges covered by the polyethylene. It is also theorized that the polyethylene binds better with the vapor deposited aluminum and serves to cushion the impact of the printhead rendering the surface more resistant to burnishing.

The introduction of polyethylene into the contrast layer enhances its leveling or reflow characteristics during drying. Certain elements, such as the carbon black used to improve contrast, cause a ribbing or ripple of the fluid during application to the surface of the paper. This ripple appears as parallel lines or ribs on the surface of the dried material. The addition of polyethylene tends to change the surface tension characteristics of the coating which improves the wetting of the coating on the applicator roll. This minimizes rib formation during application. The polyethylene also tends to disperse laterally on the surface during drying and thereby fills in the ribs generated during application. The visual appearance of the electrosensitive paper is noticeably improved as a result of this reflow characteristic.

DETAILED DESCRIPTION

Figure 1:
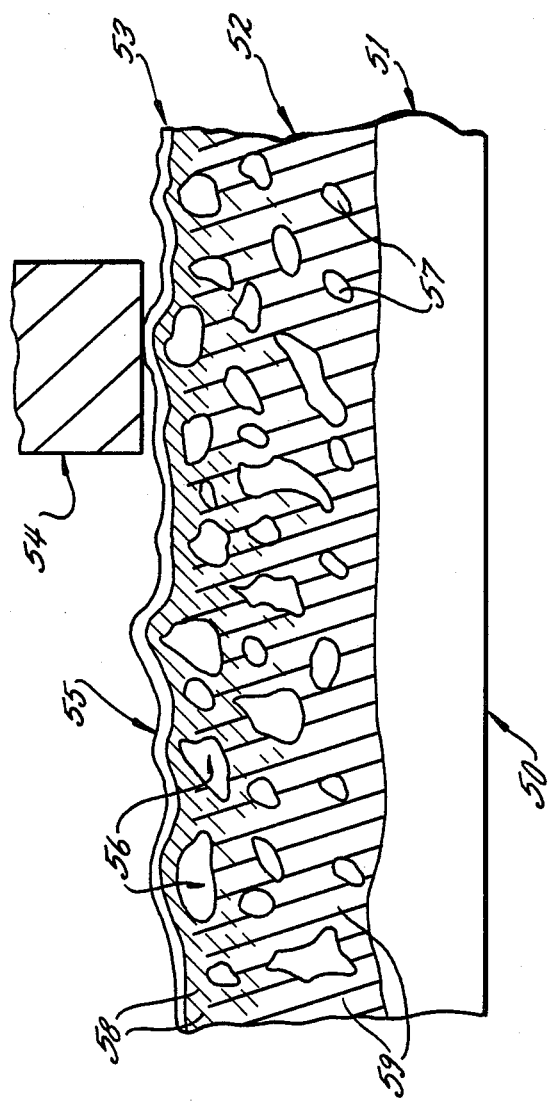
FIG. 1 is a cross section of electrosensitive recording material with the polyethylene additive.

With reference to the drawings, an electrosensitive recording medium 50 in accordance with the invention includes a base or support layer 51 normally consisting of paper, a contrast layer 52 coated on the support, and a vapor deposited metallic layer 53 covering the surface of the contrast layer opposite the support layer.

The medium 50 is employed in electrosensitive recording where an electrically actuated printhead is in moveable contact with the metallic layer 53. As the printhead 54 moves across the surface 55 it is electrically actuated to selectively burn away the metallic layer 53 exposing the contrast layer below in the form of the characters being recorded.

The contrast material 52 consists of a number of elements including a film forming resin, a pigment or dye, an antiburnishing agent and a filler including crystalline silicon dioxide 56. The filler may also include amorphous silicon dioxide 59. Any number of film forming resins may be used including ethyl cellulose, nitrocellulose, polyvinylacetate, cellulose acetate, polyvinylchloride, copolymers of vinylchloride and vinyl acetate, cellulose acetatebutyrate, methylmethecrylate, methylacrylate, ethylacrylate, butylacrylate, polystyrene, copolymers of styrene and maleic acid, copolymers of styrene and acrylic acid and copolymers of vinyl ether and maleic acid. Although a wide variety of resins may be used an acrylic ester has shown suitable characteristics for the present invention.

Table I displays the typical components of the contrast layer suitable to obtain good anti-burnishing characteristics. The film forming resin includes an acrylic ester such as that sold under the trademark ACRYLOID 66 manufactured by Rohm and Haas Company of Philadelphia, Pa.

A Carbon black pigment is used to provide appropriate tone to the contrast layer. Carbon black pigment sold under the tradename Raven 1020 by Columbian Chemicals Company, Tulsa, Okla. is used in the formulation shown in Table I.

To insure wetting and dispersion of the pigment a suspending agent sold under the trademark ANTI-TERRA-U by Byk-Mallinckrodt, Wallingford, Conn. is used. The toluene, isopropanol and ethyl acetate are used as solvents to insure good dispersion of the contrast components during application to paper. Toluene is used to suspend the acrylic ester. The polyethylene is suspended in isopropanol or xylol prior to mixing. The ethyl acetate is introduced to adjust the evaporation rate of the solvents. An appropriate evaporation rate is necessary to obtain suitable solvent release from the contrast layer while it is drying at elevated temperatures of between 150° F. and 300° F. The solvents are evaporated off during drying and should have boiling points between 100° F. and 400° F.

Where amorphous silicon dioxide is used as a filler, SYLOID 378 sold by W. R. Grace and Company, Davison Chemical Division, Baltimore, Md., is suitable to achieve the desired contrast with the metallic layer. This consists of approximately 99.7 weight percent amorphous silicon dioxide with an average particle size of about 4.3 microns. Crystalline silicon dioxide with an average particle size of about 2.7 microns is sold under the trademark MIN-U-SIL 15 by Pittsburgh Glass and Sand Corp. of Pittsburgh, Pa.

Any polyolefin or polymeric wax with a softening point between 180° F. and 300° F. and a specific gravity less than the resin is suitable for use as an anti-burnishing agent. A low density polyethylene, supplied by the Daniels Products Company of Jersey City, N.J., with a softening point between 220° F. and 290° F. has been found to be particularly suited to this purpose. Where the specific gravity of the polyethylene is between 0.90 and 0.94 it will rise to the surface of the contrast layer during drying where the resin has a higher specific gravity of approximately 1.0. The polyethylene becomes concentrated at the surface of the contrast material forming a layer 58 between the metallic surface and the remainder of the contrast material.

TABLE 1

| Liquid Contrast Coating | % by weight wet formula. |
| --- | --- |
| Acryloid B66 | 11.9 |
| Raven 1020 | 5.8 |
| Syloid 378 | 1.3 |
| Anti-terra | 0.9 |
| Toluene | 56.6 |
| Ethyl Acetate | 18.9 |
| Polyethylene | 0.9 |
| Isopropanol | 3.5 |
| Min-u-sil 15 | 0.2 |
| | 100.0 |

| Dried Contrast Coating | % by solid weight |
| --- | --- |
| Acryloid B66 | 56.7 |
| Raven 1020 | 27.6 |
| Syloid 378 | 6.2 |
| Anti-terra | 4.3 |
| Polyethylene | 4.3 |
| Min-u-sil 15 | 0.9 |

TABLE 1-continued 100.0

Figure 2:
FIG. 2 is a photomicrograph of the surface of an electrosensitive recording material with the polyethylene additive that has been subjected to burnishing.
Figure 3:
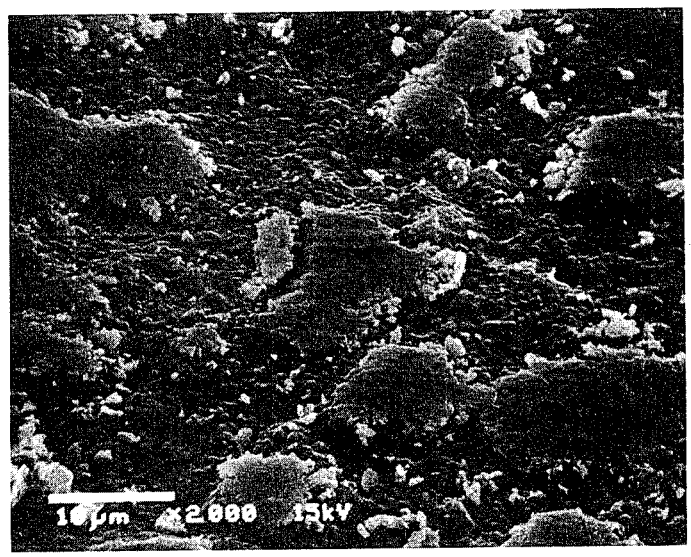
FIG. 3 is a photomicrograph of the surface of an electrosensitive recording material without the polyethylene additive that has been subjected to burnishing.

FIGS. 2 and 3 are photomicrographs taken at a 40 degree viewing angle from horizontal at 2000 magnification showing samples of electrosensitive recording material with and without the polyethylene additive respectively.

Both samples have been subjected to identical burnishing conditions on an IBM model 3232 printer where the printhead has been moved in contact across the surface of the material. Debris that has been stripped by the printhead and left on the surface is clearly visible in FIG. 3 where the antiburnishing agent was not used. Upon comparing the two samples it is evident that there has been a substantial reduction in the area of the surface that has been burnished. The reduction in burnished surface area is estimated to be between 70% and 90%. To the human eye the burnishing of samples with the polyethylene additive is virtually indiscernible from non-burnished material.

EXAMPLE

The formulation of Table 1 is prepared by feeding acrylic ester, the solvents toluene and ethyl acetate, and the carbon black pigment into a ball milling vessel. They are mixed to form a homogeneous fluid with the particles of carbon black dispersed evenly throughout.

The mixture is transferred to a vessel where the polyethylene dispersed in isopropanol, and the amorphous and crystalline silica is added and stirred until a homogeneous liquid contrast coating is ready for application to paper. The viscosity of the mixture may be adjusted by adding a 70/30 mixture of toluene and ethyl acetate to obtain an efficient application to paper using a three roll reverse roller system.

The coating is dried using a four zone convection oven with a temperature in the first zone of between 150° F. and 175° F., the temperature in the second zone is raised to about 225° F., in the third zone it is raised to 250° F., and in the fourth zone to 275° F. Transit time through the four zone oven is preferably about 8 to 10 seconds with approximately 2 to 3 seconds in each zone. The solvents are evaporated during drying to leave the dried contrast coating of Table 1. Because the polyethylene has a lower specific gravity than that of the resin, it tends to rise to the surface of the contrast material while it is drying. The polyethylene forms a layer on the surface of the contrast material on which aluminum is vapor deposited by conventional high vacuum metallization. This results in an electrosensitive recording paper having a metallic resistivity between about 1.0 to 3.0 ohms/square.

I claim:

1. The method of electrosensitive recording which comprises:
    applying an electrically actuated printhead to a metallic surface and an underlying contrast layer comprised of crystalline silicon dioxide, a polyolefin, a pigment or dye, and a film forming resin; and
    electrically penetrating the metallic surface to selectively expose portions of said underlying contrast layer;
    wherein the components in said contrast layer protect against the removal of the metallic surface while the printhead moves in contact across the surface at intervals between electrical actuations.

2. The method of claim 1 wherein said polyolefin is comprised of polyethylene with a specific gravity between 0.90 and 0.94.

3. The method of claim 1 wherein said contrast layer further comprises amorphous silicon dioxide.

4. The method of preparing an electrosensitive recording material which comprises:
    applying to a support a contrast material comprising crystalline silicon dioxide, a resin, a pigment or dye, and a polyolefin having a specific gravity less than the resin;
    drying said polyolefin to form a layer on the surface of the contrast material; and
    depositing a metallic layer on the contrast material adjacent the polyolefin layer.

5. The method of claim 4 wherein the polyolefin is comprised of polyethylene with a softening point between 150° F. and 300° F.

6. The method of claim 4 wherein said polyolefin has a specific gravity between 0.90 and 0.94.

7. The method of claim 4 wherein said contrast layer further comprises amorphous silicon dioxide.

8. The method of claim 4 wherein said drying polyolefin disperses across the surface of the contrast material to fill depressions in the surface.

9. The method of claim 4 wherein the formation of said polyolefin layer reduces the surface crystallinity of the contrast material.

10. Electrosensitive recording material comprising:
    a support;
    a contrast material upon said support including a film forming resin, a filler comprised of crystalline silicon dioxide, a pigment or dye, and a polyolefin; and
    a metallic layer upon said contrast material;
    wherein said polyolefin comprises a layer on the surface of the contrast material adjacent the metallic layer;
    wherein said contrast material reduces the removal of the metallic layer as a printhead moves in contact across said layer at intervals between electrical actuations of the printhead.

11. An electrosensitive recording material as defined in claim 10 wherein said polyolefin layer reduces the surface crystallinity of the contrast material.

12. An electrosensitive recording material as defined in claim 10 wherein said filler is comprised of amorphous silicon dioxide.

13. An electrosensitive recording material as defined in claim 10 wherein said pigment or dye is carbon black, or a nigrozine dye.

14. An electrosensitive recording material as defined in claim 10 wherein said polyolefin is comprised of polyethylene having a softening point between 150° F. and 300° F.

15. An electrosensitive recording material as defined in claim 14 wherein the polyethylene comprises between 3% and 12% by weight of the contrast material.

16. An electrosensitive recording material as defined in claim 14 wherein the polyethylene comprises 6% by weight of said contrast material.

17. An electrosensitive recording material as defined in claim 10 wherein the support is comprised of paper.

18. An electrosensitive recording material as defined in claim 10 wherein the metallic layer is comprised of vapor deposited aluminum.

19. An electrosensitive recording material as defined in claim 10 wherein the crystalline silicon dioxide is comprised of particles with an average size between 2.0 and 10 microns and a hardness of at least 7 on the Moh scale.

* * * * *